United States Patent [19]

Garrett

[11] 4,244,459

[45] Jan. 13, 1981

[54] PARISON UNSCRAMBLER

[76] Inventor: Burton R. Garrett, 131-12 232nd St., Laurelton, N.Y. 11413

[21] Appl. No.: 872,566

[22] Filed: Jan. 26, 1978

[51] Int. Cl.³ .............................................. B65G 47/24
[52] U.S. Cl. ..................................... 198/389; 198/396
[58] Field of Search ............... 198/389, 396, 443, 444, 198/445, 446, 453, 454, 455, 624; 227/119; 221/163, 165, 167, 168

[56] References Cited

U.S. PATENT DOCUMENTS

| | | | |
|---|---|---|---|
| 1,236,019 | 8/1917 | Tzibides | 198/454 |
| 2,252,498 | 8/1941 | Flaws | 198/389 X |
| 2,377,431 | 6/1945 | Lakso | 198/389 X |
| 2,602,555 | 7/1952 | Hutaff | 198/624 |
| 2,828,788 | 4/1958 | Ashlock | 198/396 |
| 3,071,291 | 1/1963 | Davis | 221/167 X |
| 3,365,048 | 1/1968 | Ehrlich et al. | 221/156 X |
| 3,439,791 | 4/1969 | Matthews et al. | 198/446 |
| 3,517,797 | 6/1970 | Daleffe et al. | 198/389 |
| 3,567,006 | 3/1971 | Bell et al. | 221/165 X |
| 4,112,975 | 10/1978 | Lowery et al. | 198/389 X |

*Primary Examiner*—James L. Rowland
*Attorney, Agent, or Firm*—Bierman & Bierman

[57] ABSTRACT

Apparatus for unscrambling, orienting and feeding elongated objects, such as parisons, having flanges thereon, in a sorting chamber which receives the objects and then passes them on to a further processing station, comprising one or more pairs of longitudinally mounted rollers for unscrambling and orienting the objects in the sorting chamber and then directing them to tracks adjacent the ends of the feeding roller pairs, for receiving the objects and forwarding them to the processing station. The flanges on the objects prevent them from passing between the feeding rollers which are spaced apart sufficiently to receive the body of the object but are close enough to prevent the passage of the flanged objects therebetween. The rollers rotate on longitudinal axes and are inclined to promote gravity feed of the objects along their length. Tracks adjacent the end of the feeding rollers receive the objects fed therefrom and are also inclined to promote gravity feed of the objects along the track to the subsequent processing station. Means are provided to prevent overloading in both the sorting chamber and on the tracks.

8 Claims, 9 Drawing Figures

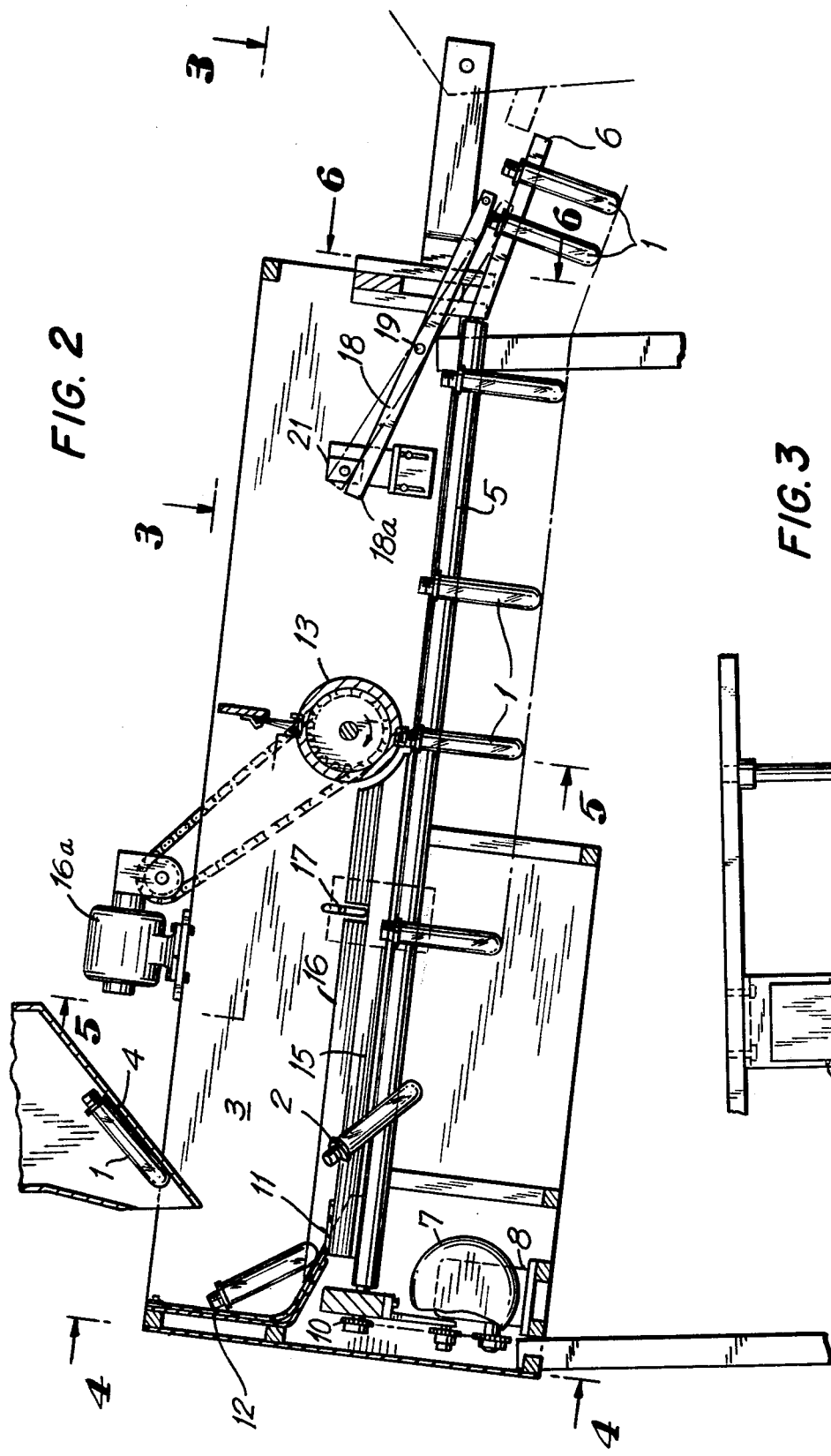
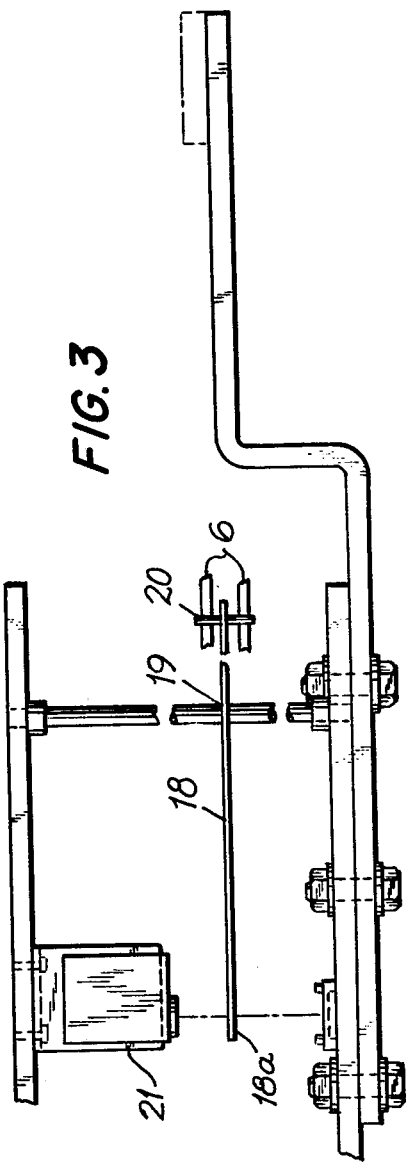

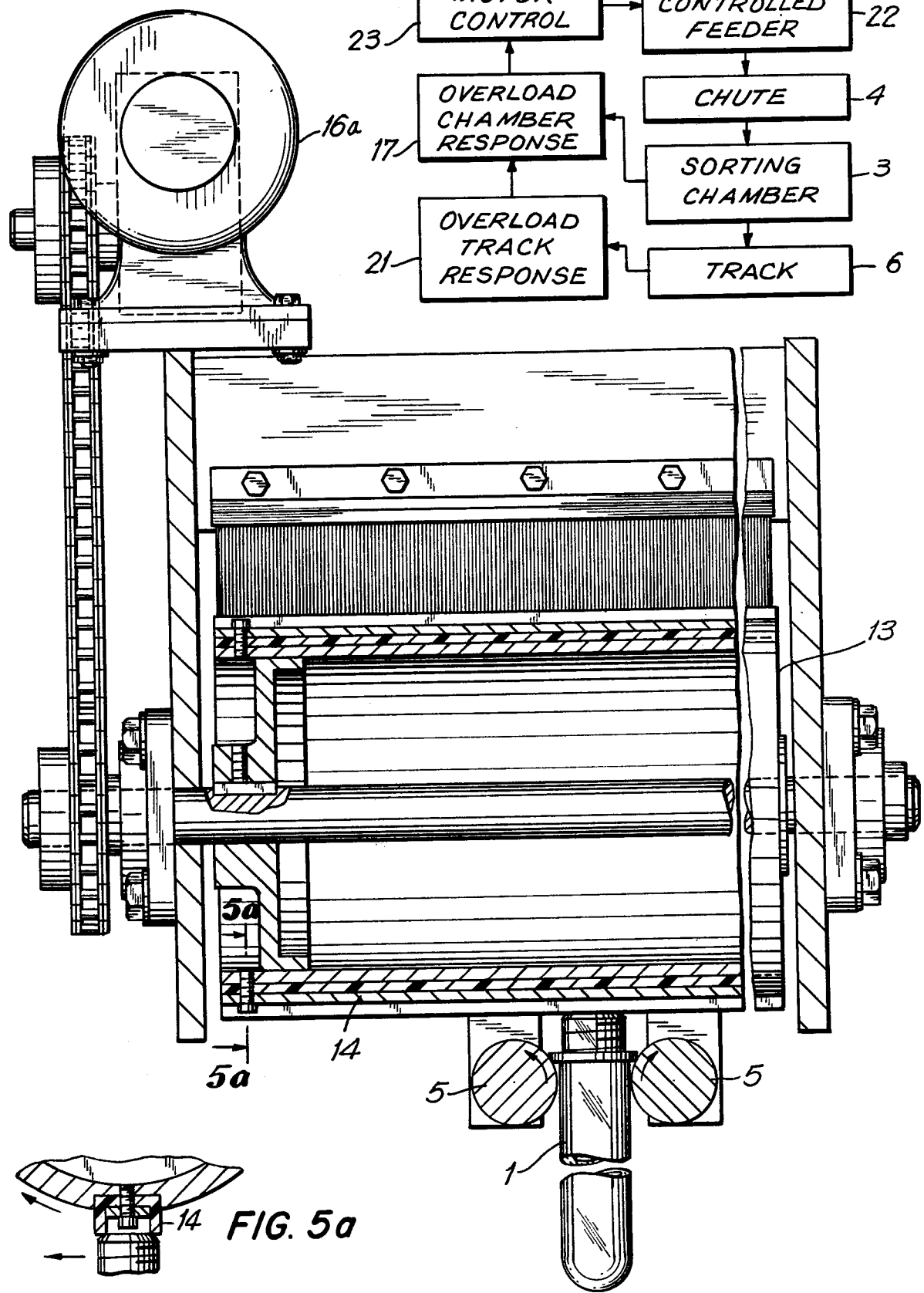
FIG. 5
FIG. 5a
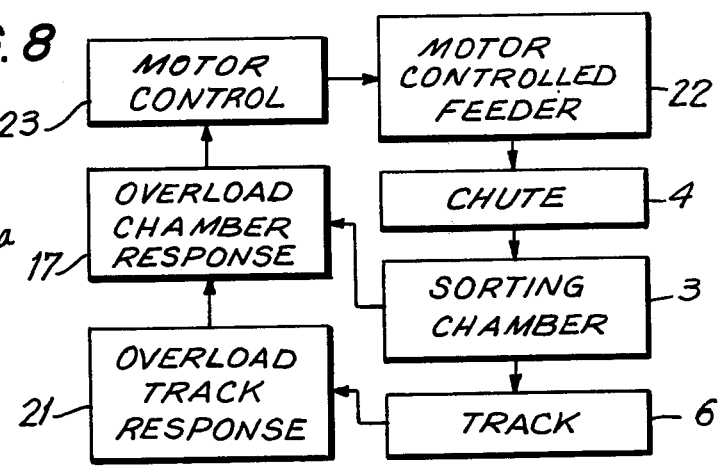
FIG. 8

PARISON UNSCRAMBLER

This invention relates to machinery for unscrambling, orienting and feeding elongated objects having a flange and more particularly objects such as preforms or parisons made of soft plastic material which are subsequently processed as by passing them on to a blow-molding machine. In manufacturing such objects, the product will often go through several processing steps before it becomes a finished product and certain of the intermediate steps are performed in bulk operation. In order efficiently to transfer the objects from one processing station to another, it is often necessary to unscramble and orient them so that they will be acceptable to the machine at the next processing station. When such objects are soft or otherwise susceptible to scratches or other damage, this operation must be accomplished gently.

This invention is capable of unscrambling, orienting and conveying any elongated object or product having a properly shaped flange. It can be used with any cylindrical, rectangular or tapered object having flanges that will prevent the body of the object from passing between parallel rollers when the object is oriented with its narrowest profile between the rollers. As above stated, it may be used to unscramble, orient and feed parisons which are test-tube shaped objects having a flange near their open end. A parison or preform, as it is sometimes called, is an intermediate step in the forming of plastic bottles. The parisons are fed to a blow-molding machine which transforms them into bottles of the desired size. Any scratches or defects in the parisons will be magnified in the finished bottle, so that gentle handling is essential.

The invention can be also used to feed plastic bottles having a suitable flange to a filling, capping or labeling machine.

GENERAL DESCRIPTION OF THE INVENTION

The invention essentially comprises a sorting chamber for receiving objects at one end and discharging them from the other. The sorting chamber has one or more parallel pairs of feeding rollers mounted longitudinally in and leading from the sorting chamber. The space between the feeding rollers is large enough to receive the body of the objects being unscrambled and reoriented but small enough to prevent passage of the flanged portion therebetween. The roller pairs rotate on a longitudinal axis relative to the direction of feed, the rotation being such that the surfaces of the rollers contacting the objects therebetween move upwardly. This promotes longitudinal feed and orientation of the objects. Means are provided at the entrance of the sorting chamber and between and alongside the roller pairs to prevent the objects from unnecessarily hitting the rollers and to assist in channeling the objects so that they fall between the roller pairs.

It is preferred that the sorting chamber also be provided with a rotatable clearing wheel. The clearing wheel is located above the feeding rollers and has its rotational axis substantially transverse to the direction of feed. The vertical distance between the clearing wheel and the feeding rollers is selected to prevent objects not properly oriented between the feeding rollers from advancing past the clearing wheel. The wheel rotates in an upward direction with respect to the objects moving toward it along the feeding rollers. Preferably the periphery of the clearing wheel is provided with a soft material projecting therefrom for gently wiping back objects not properly oriented. This promotes scratch-free handling.

The apparatus preferably also includes tracks at the discharge end of the sorting chamber, these tracks being adjacent to and aligned with the ends of the feeding roller pairs to receive the objects fed therefrom. These track means are inclined to provide gravity feed to a subsequent processing station.

Sensing means are preferably provided in the sorting chamber and on the track means to sense when too many objects become piled up in the sorting chamber or when the tracks are completely filled with objects. When either of these conditions occurs, means are provided in response to the sensing means to cut off feed of the objects to the sorting chamber.

Standard equipment, such as an overhead conveyor or an inclined cleated conveyor, may be utilized to feed the objects into the sorting chamber. Preferably they descend to the sorting chamber by means of a chute or baffle and in a preferred form of the invention the objects will first fall upon soft means such as a plastic belt draped over the entrance to the sorting chamber and extending partially over the feeding rollers. Such belt gently breaks the fall of the objects and reduces their impact upon the rollers to minimize nicks and scratches.

It is accordingly a primary object of the present invention to provide equipment for unscrambling, sorting and orienting elongated objects such as parisons or preforms, and particularly such objects made of soft plastic material, and to carry out such operation in not only an efficient manner but one which will subject such objects to a minimum of damage.

The foregoing and other objects and advantages of the invention will be best comprehended by reference to the detailed description of a preferred embodiment thereof as set forth below. In the accompanying drawings, in which like reference characters indicate like parts, FIG. 1 is a perspective view of a preferred embodiment of the unscrambler according to the present invention, particularly adapted for handling plastic preforms;

FIG. 2 is a cross-sectional view taken along the lines 2—2 of FIG. 1;

FIG. 3 is a partial enlarged sectional view taken along the lines 3—3 of FIG. 2, with some parts eliminated for clarity;

FIG. 5 is an enlarged cross-sectional view taken along the lines 5—5 of FIG. 2;

FIG. 5a is a partial sectional view taken along the lines 5a—5a of FIG. 5 with some parts eliminated for the sake of clarity;

FIG. 8 is a block diagram depicting the interrelationship between certain elements of the present invention.

Figure 1:
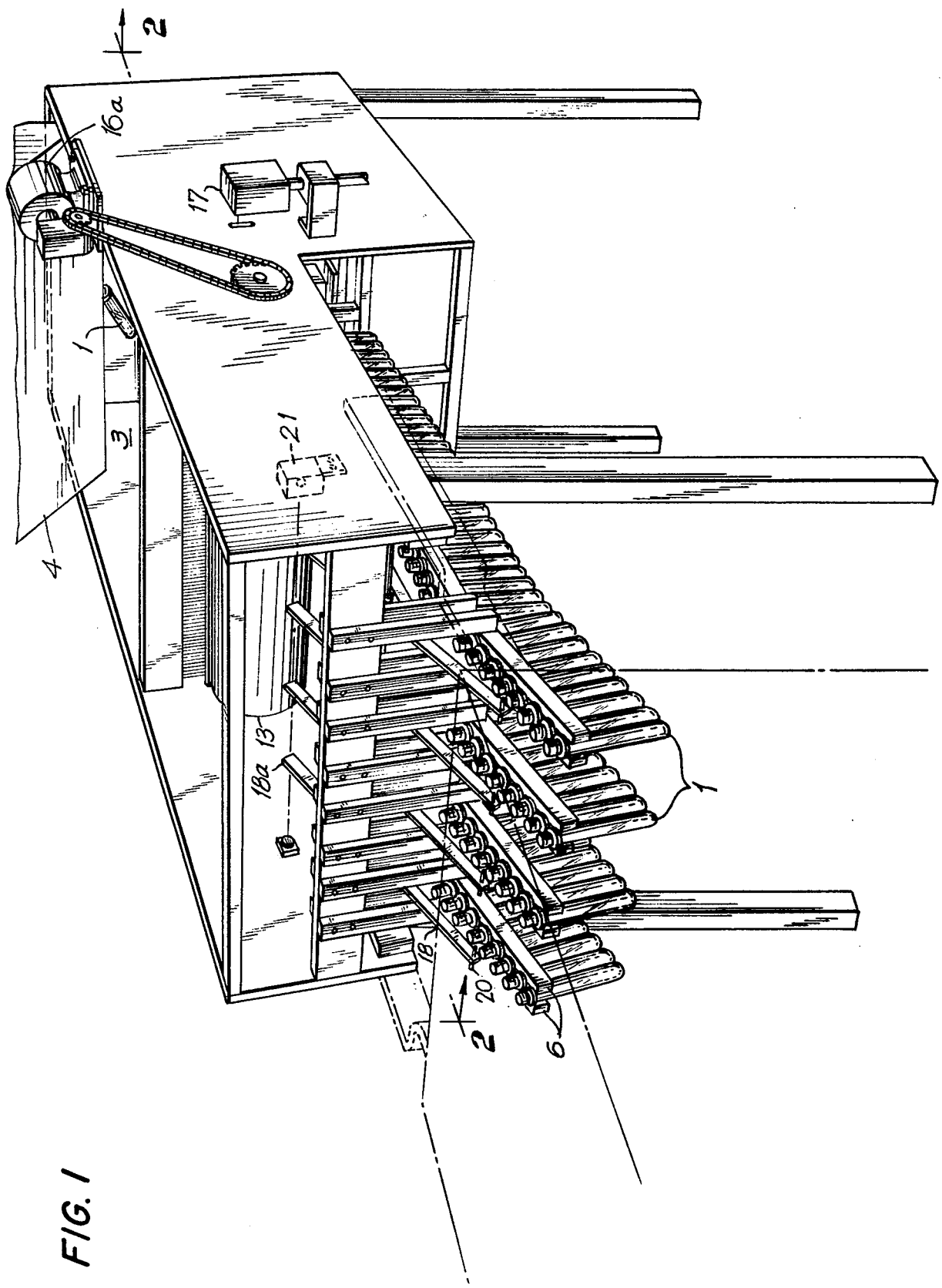

Referring particularly to FIGS. 1 and 2, preforms or parisons 1 are each provided with a flange 2 near one end thereof. These are dropped into a sorting chamber 3 constructed according to the present invention in a manner hereinafter described in more detail below, from chute or baffle 4. Except as further described, the exact manner in which the preforms arrive at the chute or baffle 4 is of no significance in respect of the present invention, but usual means such as a motor-driven overhead conveyor or a bulk hopper having an inclined motor-driven cleated conveyor are contemplated.

Sorting or unscrambling chamber 3 includes one or more pairs of rotatably mounted feeding rollers 5 positioned beneath the chute 4 at one end, and extending beyond the chamber 3 at their other end to aligned discharge tracks 6. As illustrated, the pairs of rollers are slightly downwardly inclined from the receiving end of the chamber to the discharge end, a gradient of 8° being preferable for the purposes in mind, and the distance between each pair is such that the body of the preform will drop through the intervening space, but the preforms will still be supported on the rollers by reason of the integral flange 2.

Figure 4:
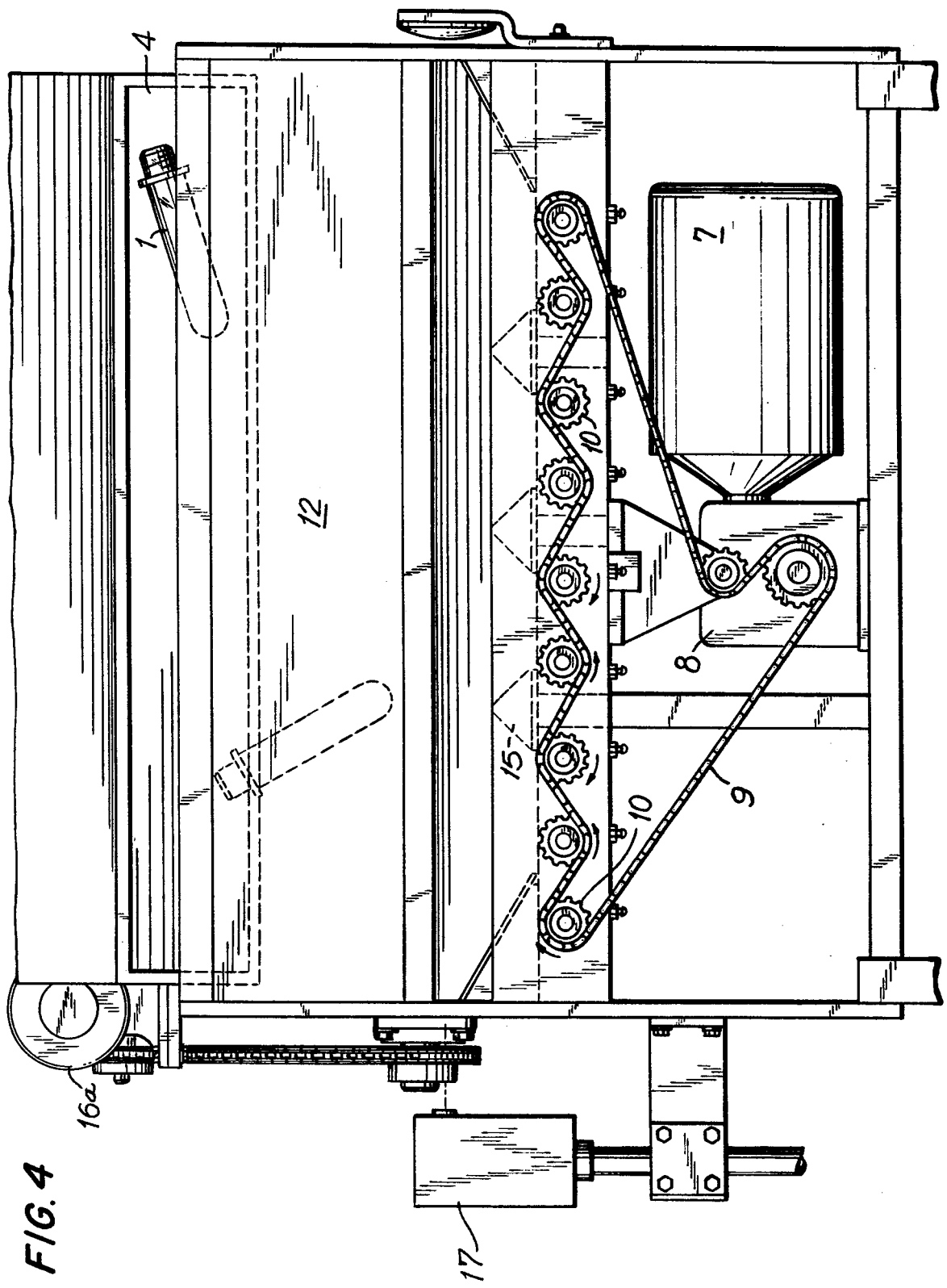
FIG. 4 is an enlarged cross-sectional view taken along the lines 4—4 of FIG. 2.
Figure 6:
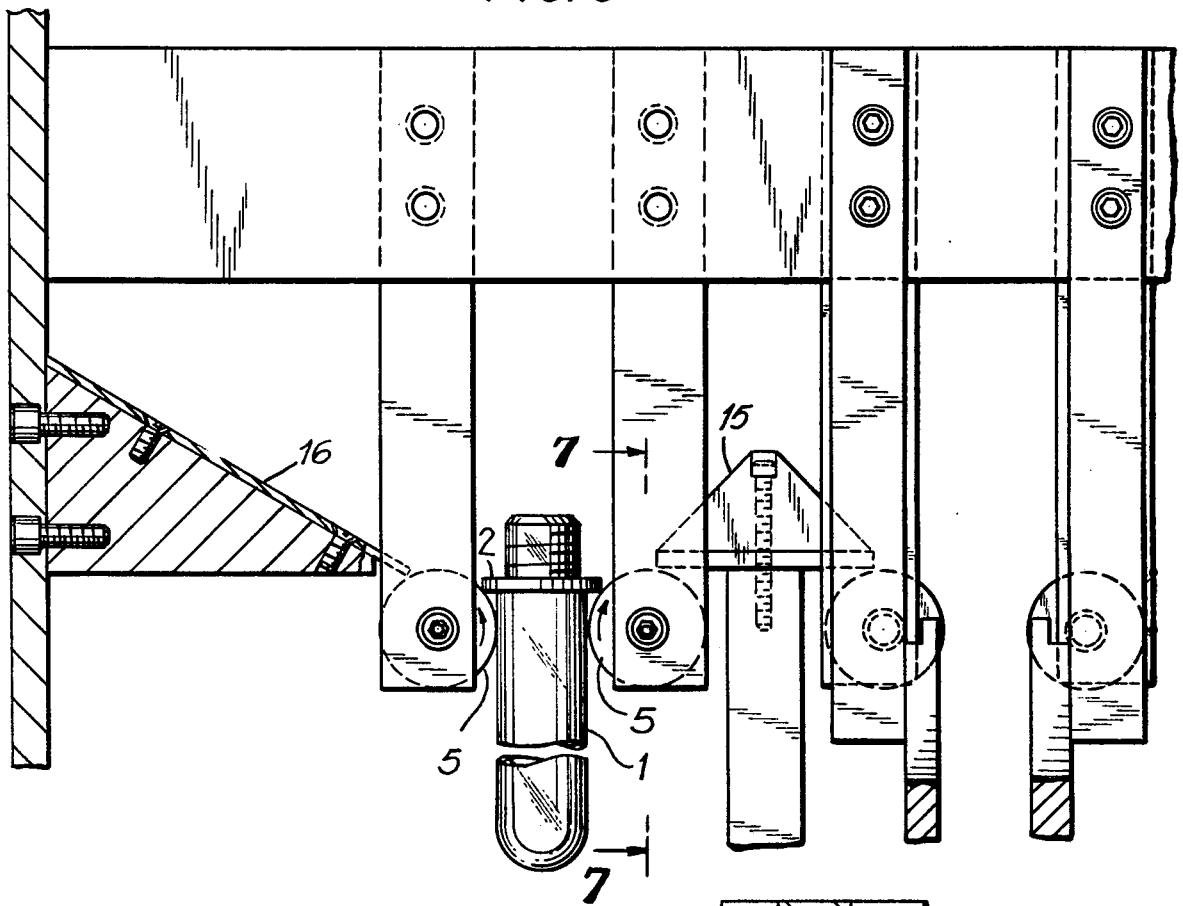
FIG. 6 is an enlarged cross-sectional view taken along the lines 6—6 of FIG. 2 with some parts eliminated for the sake of clarity.

As more specifically shown in FIGS. 4 and 6, each pair of longitudinally mounted rollers 5 is rotated in an upward direction relative to the preforms falling between them. Rotation of the rollers in this manner may be accomplished by any suitable means such as motor 7, gear box 8, link chain 9 and sprocket wheels 10. This upward rotational movement of rollers 5 effects proper orientation of the preforms and together with their downward inclination gently moves the preforms through the sorting chamber and onto the aligned discharge tracks 6.

In a preferred embodiment of the invention, at the receiving end of chamber 3 a flexible belt 11 (FIG. 2) is draped over the ends of roller pairs 5 in the path of chute 4. This flexible belt may be made of plastic or other soft material and functions to break the fall of preforms 1, keeping them out of immediate contact with the rollers, and thereby prevents nicking or scratching of the preforms. Such nicks or scratches must be avoided since they become enlarged and magnified when preforms are blown into full-sized bottles. A suitable, preferably L-shaped support 12 may be used to support the plastic belt 11 and direct it above the ends of roller pairs 5.

A rotatable clearing wheel 13 is mounted transversely of chamber 3 and spaced above feeding roller pairs 5. Preferably, this clearing wheel 13 is provided with a plurality of transverse channels across its surface and each channel has a soft material 14 such as polyurethane mounted therein (see FIG. 5a). This soft material 14 protrudes a selected distance beyond the perimeter of the clearing wheel and gently wipes back preforms not properly oriented between the rollers, without nicking or scratching them, and in cooperation with longitudinally extending triangular guides 15 and inclined side plates 16 assists in reorienting the preforms. The vertical spacing of clearing wheel 13 above rollers 5 is such that the preforms are prevented from leaving chamber 3 unless they have fallen into position between the roller pairs. The clearing wheel is driven by any suitable means such as motor 16a.

Clearing wheel 13 may be adjustably mounted to accommodate preforms or other objects of different sizes and likewise the feeding roller pairs 5 may also be adjustably mounted so that the distance between may be varied to accommodate different size objects.

Guides 15 are preferably made of soft material such as maple, again to prevent nicking or scratching of the preforms and keep them away from the hard upper surface of the rollers. Side plates 16 are also preferably made of some relatively soft material such as phenolic material.

Figure 7:
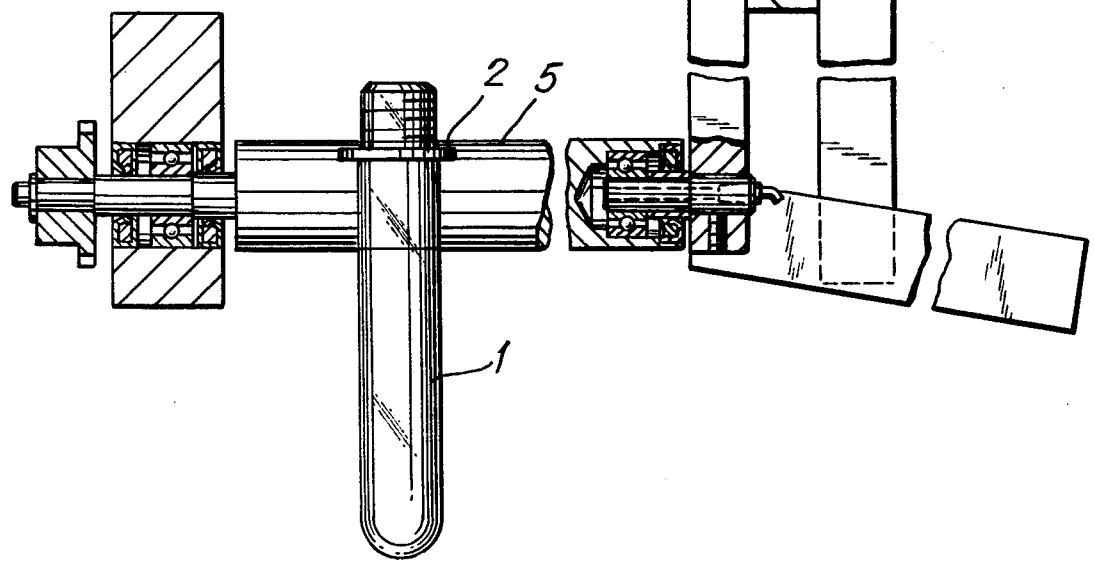
FIG. 7 is a partial sectional view taken along the lines 7—7 of FIG. 6 with some parts eliminated for the sake of clarity.

As previously mentioned, tracks 6 (see FIGS. 1, 2 and 7) are positioned in alignment with and adjacent the discharge end of feeding rollers 5 to receive the preforms discharged therefrom. The tracks 6 are inclined downwardly away from the roller pairs 5 to promote gravity feed of the preforms to the next processing station (indicated with broken lines in FIG. 2). This processing station may, for example, be a blow-molding machine. As is clearly shown, the preforms hang by their flanges between the tracks. If, as indicated above, the roller pairs 5 and wheel 13 are made adjustable to accommodate larger or smaller objects, the spacing between the tracks would be made correspondingly adjustable.

The overall operation of my invention, together with additional features thereof, will now be described. The preforms are fed to the unscrambler from some well-known motor-controlled bulk feeding device. Descending chute or baffle 4, they fall into sorting chamber 3, their fall being softened to prevent injury by first contacting plastic belt 11 which directs them over the pairs of rotating rollers 5. The rotating roller pairs not only tend to move the preforms toward the discharge end of chamber 3, but also orient the preforms so that they fall between the roller pairs and are held in such position by the individual flanges 2.

As the preforms move toward the discharge end of the chamber by the combined action of gravity and the rotating roller pins, they eventually meet clearing wheel 15. At this point, if the preforms have fallen into position between the rollers, they will pass under the clearing wheel and hence proceed toward the discharge end and track pairs 6. The unoriented preforms will be gently wiped back by the clearing wheel and with the assistance of guides 15 and side plates 16 will eventually assume their proper position between the roller pairs. In the event that the preforms pile up to an undesired amount, this condition may be detected by any well-known means such as by the interruption of the beam of an "electric eye" indicated at 17. Interruption of this beam by the piled-up preforms made through well-known means cuts off the flow of preforms from the bulk feeder, i.e., by shutting off the motor feed. Since all of these elements are well known, they have been indicated in block diagram form in FIG. 8 in which the electric eye 17 mounted in the sorting chamber 3 actuates a suitable motor control 23 which in turn operates motor-controlled feeder 22 which, as previously mentioned, may be a suitable type of conveyor.

At the discharge end where the roller pairs 5 pass the preforms onto inclined track pairs 6, it has been found desirable to stop the flow of the preforms whenever all of the track pairs have been filled up as may occur whenever there is a stoppage or overload of the next processing station. This control is preferably effected by means of a series of pivot arms 18 supported off-center at 19, so that when no preforms are present at a selected point, preferably near the upper end of a track, the pivot arm for that track will rest thereon as by pins 20. In such event, the upper end 18a of that pivot arm will block the path of the beam of another electric eye 21. Conversely, whenever all of the tracks are filled, ends 18a of the individual arms are pushed downwardly by the projecting end of the preforms and the light beam will activate the usual control circuit (not shown). Whenever this occurs, the bulk-feeder is again shut off.

Reference is again made to the block diagram in FIG. 8 indicating the overload track response device 21, i.e., the electric eye operating in response to conditions on track 6 and in a series circuit with the overload response 17 in the motor control circuit. As a result of this arrangement, an overload in either the sorting chamber or on the tracks will, therefore, result in cutting off supply of preforms to the unscrambler apparatus. In actual practice, clearing wheel 15 generally keeps the preforms from piling up to actuate electric eye 17, overloading of tracks 6 and actuation of device 21 therefore coming into play more often.

Variations of the equipment as above described will readily occur to those skilled in this art and are deemed to fall within the scope of this invention. Obviously, structural details and size of the equipment will depend upon spatial requirements, size of the preforms, etc. Adjustability of various parts, as previously indicated, is contemplated. The particular driving means for rollers 5 and the clearing wheel 6 and the positioning thereof may be changed in accordance with the overall design of the machine. While a particular choice of material for certain of the parts has been indicated, suitable other materials having like characteristics may be substituted therefor. Accordingly, while I have shown and described one specific embodiment of my invention, the latter is not limited thereto except as set forth in the claims which follow.

What is claimed is:

1. In an apparatus for unscrambling, orienting and feeding elongated objects having a radial flange as they move from a feeder to a processing station, the combination of a sorting chamber for receiving said objects at one end thereof, and discharging them from the other end, one or more pairs of smooth feeding rollers mounted longitudinally throughout the length of said sorting chamber, the space between the rollers of each pair being large enough to receive the body of the object and small enough to prevent the passage of the flanged portion therebetween, said feeding rollers being inclined downwardly from the receiving end of said chamber to the discharge end thereof to promote gravity feed of said objects through said sorting chamber, and means for rotating said rollers of each pair at equal speed in an upward direction to aid in feeding said objects along the rollers and through said chamber, in combination with a rotatable clearing wheel in said sorting chamber, means mounting said clearing wheel so that its axis is substantially at right angles to the direction of feed of said feeding rollers and positioning the same above said feeding rollers a distance sufficient to prevent those objects not properly located between said feeding rollers from advancing beyond said clearing wheel, and means driving said clearing wheel in a direction opposite to the normal movement of the objects being oriented and passing through said sorting chamber.

2. Apparatus according to claim 1, in which said clearing wheel is provided with one or more transverse channels on its periphery, and relatively soft material positioned in each channel and protruding from said wheel for gently engaging the objects not properly positioned between the rollers.

3. Apparatus according to claim 1, in combination with means in said sorting chamber for sensing the level of objects therein, and means responsive to a predetermined level of objects in said sorting chamber for stopping said feeder whenever said level has been reached.

4. In an apparatus for unscrambling, orienting and feeding elongated objects having a radial flange as they move from a feeder to a processing station, the combination of a sorting chamber for receiving said objects at one end thereof, and discharging them from the other end, one or more pairs of feeding rollers mounted longitudinally throughout the length of said sorting chamber, the space between the rollers of each pair being large enough to receive the body of the object and small enough to prevent the passage of the flanged portion therebetween, said feeding rollers being inclined downwardly from the receiving end of said chamber to the discharge end thereof to promote gravity feed of said objects through said sorting chamber, means for rotating said rollers in an upward direction to aid in feeding said objects along the rollers and through said chamber, a rotatable clearing wheel in said sorting chamber, means mounting said clearing wheel so that its axis is substantially at right angles to the direction of feed of said feeding rollers and positioning the same above said feeding rollers a distance sufficient to prevent those objects not properly located between said feeding rollers from advancing beyond said clearing wheel, means driving said clearing wheel in a direction opposite to the normal movement of the objects being oriented and passing through said sorting chamber, said clearing wheel being provided with one or more transverse channels on its periphery, and relatively soft material positioned in each channel and protruding from said wheel for gently engaging the objects not properly positioned between the rollers, in combination with means mounted between each adjacent pair of feeding rollers for guiding said objects onto and between the rollers of each pair.

5. Apparatus according to claim 4, in which said means comprises a beam of relatively soft material, said beam having a triangular cross-section with the base of the triangle positioned immediately above adjacent roller pairs.

6. Apparatus according to claim 5, in which said beam is made of maple.

7. Apparatus according to claim 6, in combination with tracks aligned with and adjacent the ends of said feeding roller pair for receiving said objects, said track means being inclined to promote gravity feed of said objects along said tracks to the processing station, sensing means for sensing the presence and absence of objects at a selected location at each of said tracks, means to stop operation of the feeder when said sensing means indicates objects on all of said tracks, and means serially connecting the track sensing means and said object sensing means to stop operation of the feeder whenever either of the track sensing means or the object sensing means is actuated.

8. In an apparatus for unscrambling, orienting and feeding elongated objects having a radial flange as they move from a feeder to a processing station, the combination of a sorting chamber for receiving said objects at one end thereof, and discharging them from the other end, one or more pairs of feeding rollers mounted longitudinally throughout the length of said sorting chamber, the space between the rollers of each pair being large enough to receive the body of the object and small enough to prevent the passage of the flanged portion therebetween, said feeding rollers being inclined downwardly from the receiving end of said chamber to the discharge end thereof to promote gravity feed of said objects through said sorting chamber, means for rotating said rollers in an upward direction to aid in feeding said objects along the rollers and through said chamber, tracks aligned with and adjacent the ends of said feeding roller pairs for receiving said objects therefrom, said track means being inclined to promote gravity feed of said objects along said tracks toward the final processing station, means positioned at a selected location at each of said tracks for sensing the presence and absence of objects at such location, and means to stop operation of the feeder when said means senses the presence of objects at the selected location on all of said tracks, said sensing means comprising a plurality of arms mounted above and in alignment with each track, the lower end of each arm being urged downwardly to rest upon the track, whereby the lower end of said arm is moved upwardly and the upper end is moved downwardly whenever an object is on said track at the selected location, in combination with an electric eye having a beam extending transversely across the upper ends of said arms, and means positioning said electric eye so that said beam is intercepted by the upper end of said arms whenever any track is free of objects, but is not intercepted when all of said tracks are full.

* * * * *